(12) United States Patent
Uebbing et al.

(10) Patent No.: US 8,713,892 B2
(45) Date of Patent: *May 6, 2014

(54) METHOD FOR ASSEMBLING SHELL SEGMENTS FOR FORMING TOWER SECTIONS OF A HYBRID WIND TURBINE TOWER

(75) Inventors: Werner Uebbing, Avignon Cedex (FR); Alberto González Del Egido, Barcelona (ES); Núria García Gómez, Cornellà de Llobregat (ES)

(73) Assignee: Alstom Renovables España, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/980,311

(22) PCT Filed: Jan. 23, 2012

(86) PCT No.: PCT/EP2012/050965
§ 371 (c)(1),
(2), (4) Date: Jul. 17, 2013

(87) PCT Pub. No.: WO2012/101088
PCT Pub. Date: Aug. 2, 2012

(65) Prior Publication Data
US 2013/0298496 A1 Nov. 14, 2013

(30) Foreign Application Priority Data
Jan. 24, 2011 (EP) .................................... 11382018

(51) Int. Cl.
*E04G 21/00* (2006.01)
*E04B 1/00* (2006.01)
(52) U.S. Cl.
USPC ................... 52/745.17; 52/742.14; 52/745.18

(58) Field of Classification Search
USPC .............. 52/40, 742.14, 745.17, 745.18, 831, 52/836, 845
See application file for complete search history.

(56) References Cited

U.S. PATENT DOCUMENTS

| | | | |
|---|---|---|---|
| 2005/0166521 A1 | 8/2005 | Silber | |
| 2010/0083609 A1* | 4/2010 | Koren et al. | 52/745.18 |
| 2010/0139181 A1* | 6/2010 | Cortina-Cordero et al. | 52/125.2 |

FOREIGN PATENT DOCUMENTS

| | | |
|---|---|---|
| EP | 2 253 781 | 11/2010 |
| WO | WO 2004/083633 | 9/2004 |
| WO | WO 2010/049313 | 5/2010 |
| WO | WO 2010/067166 | 6/2010 |

OTHER PUBLICATIONS

International Search Report for Appl. No. PCT/EP2012/050965 mailed May 30, 2012, 11 pgs.

* cited by examiner

*Primary Examiner* — Charles A Fox
*Assistant Examiner* — Patrick Maestri
(74) *Attorney, Agent, or Firm* — Squire Sanders (US) LLP

(57) ABSTRACT

It comprises providing at least two metal shell segments arranged adjacent to each other, forming a column of concrete on at least a joint portion of adjacent shell segments, placing a formwork to form said column of concrete, assembling a support framework before providing shell segments, providing an auxiliary sub-structure internal to the shell segments, and an attaching formwork associated both with the internal support framework and to the shell segments. The assembling of the internal support framework may be carried out by providing at least a first series of auxiliary pillars, joining the auxiliary pillars to each other to form a first auxiliary sub-structure and arranging an attaching formwork attached to said auxiliary pillars.

17 Claims, 2 Drawing Sheets

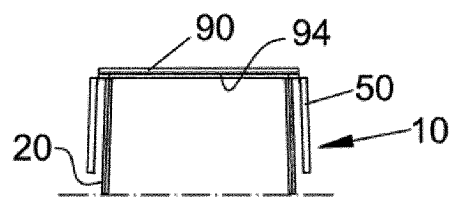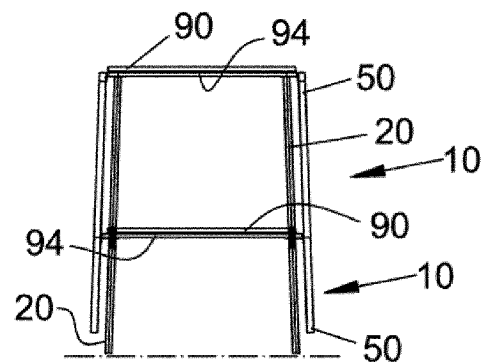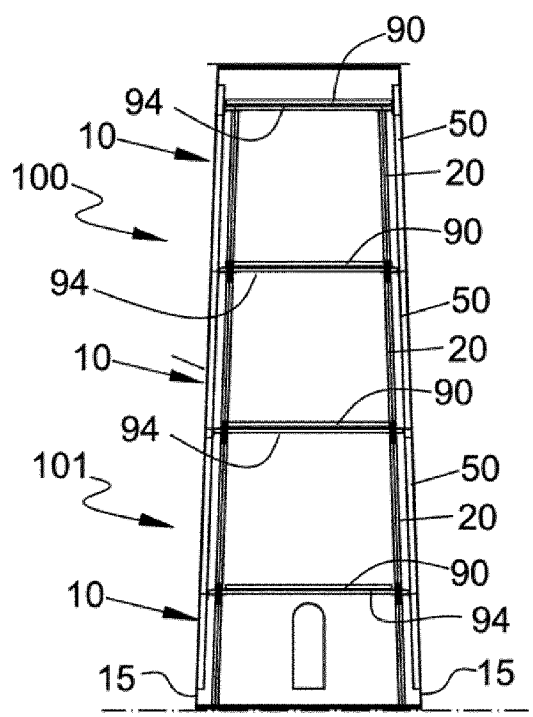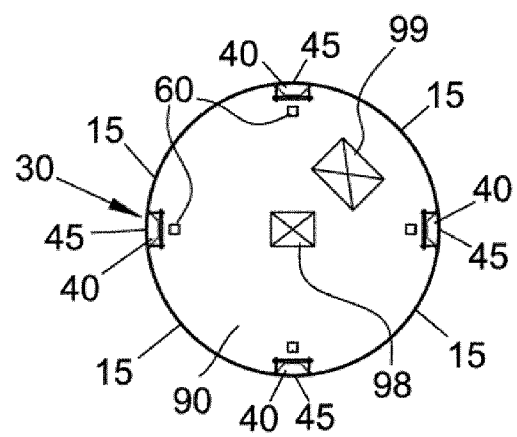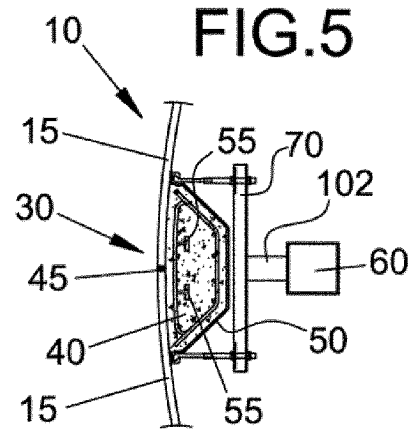

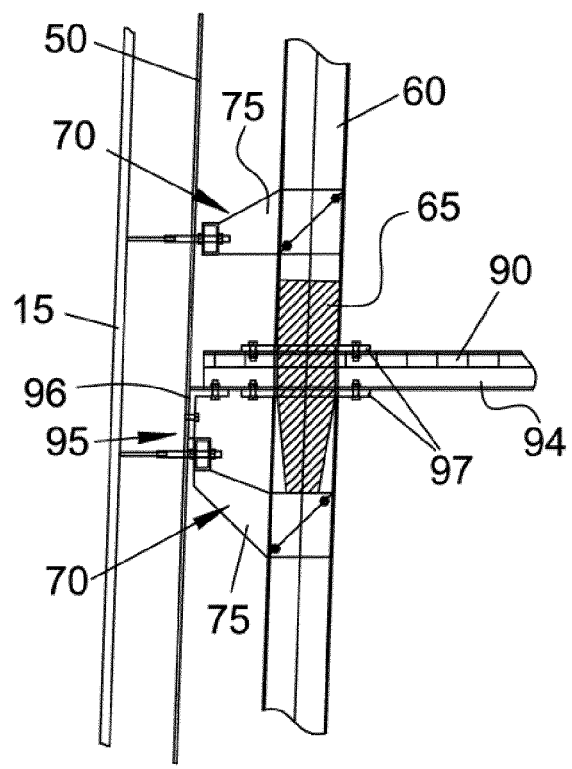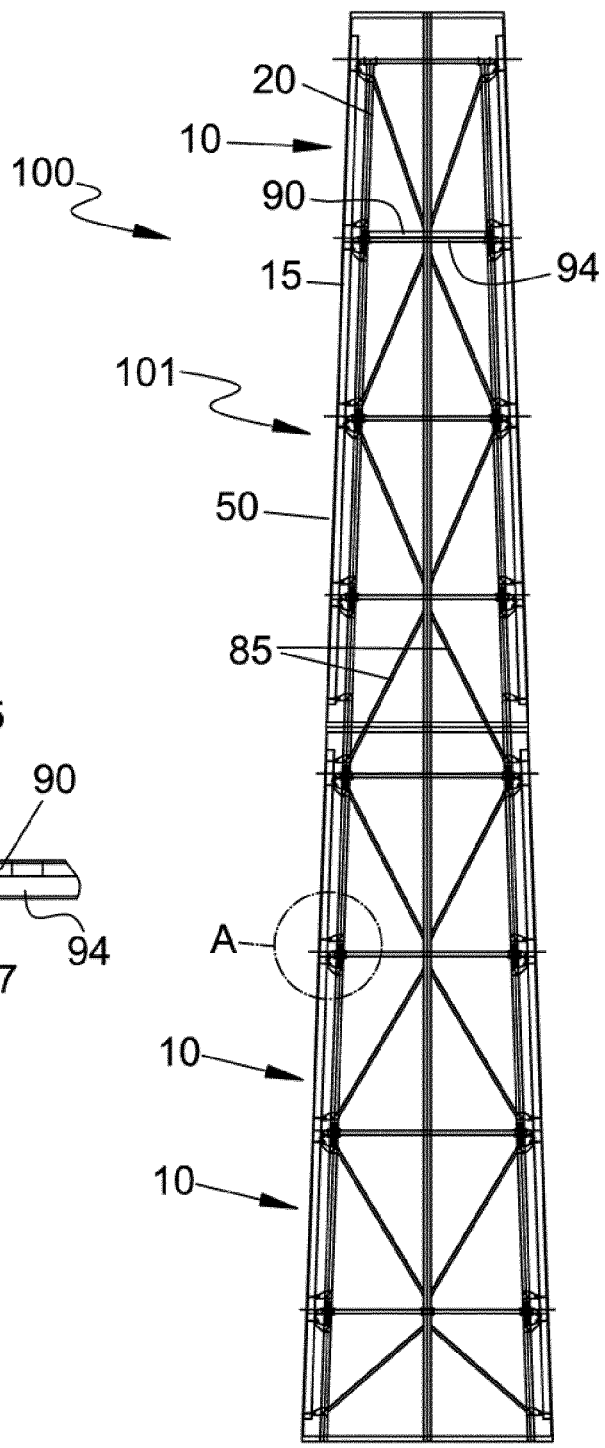

METHOD FOR ASSEMBLING SHELL SEGMENTS FOR FORMING TOWER SECTIONS OF A HYBRID WIND TURBINE TOWER

TECHNICAL FIELD

The present disclosure relates to wind turbine towers and more particularly to a method for assembling shell segments for forming tower sections of a hybrid wind turbine tower as defined in the preamble of claim 1.

BACKGROUND

In wind turbine applications there is a trend to build increasingly higher towers in order to obtain increased power. Increased height results in higher loads at the base of the tower. Therefore, the lower sections of the tower must be made wider. The diameter at the bottom of wind turbine towers is increasingly larger to the point of not being able to be transported by road easily. At this point, two alternatives have been proposed consisting in either making the lower portion of the tower in situ (e.g. of concrete) or making the tower using prefabricated elements which are then assembled in situ.

As used herein, a tower section includes of two or more shell segments such that, in an assembled condition, the shell segments define a tower section. Each tower section is thus a substantially hollow structure corresponding to a level in the wind turbine tower. Tower sections are formed through the use of e.g. connecting means for mutually joining two adjacent shell segments along a substantially vertical joint.

Methods for assembling shell segments are known in the art. For example, WO2010067166A1 discloses a method for building a wind turbine tower in which pre-assembled concrete segments of a tower section are provided. Segments are then lifted and positioned to obtain a full tower section. The method disclosed in this document makes use of a number of connecting elements such as pre-stressing tendons, cables or strands that are fitted within ducts in cylindrical modules, which makes the resulting assembly process complex and capital intensive.

Another example is WO2010049313A2 that discloses a method for erecting a segmented steel tower for a wind turbine in which a climber is first built, carrying the top section of the tower. The climber carries the weight of the top section during all the installation of the segments of the tower, but is independent of the weight of the segmented tower. The method disclosed in this document requires two supporting structures, one of them with attaching lifting mechanism, which requires high-resistance capacities and makes more complex and expensive the assembly process.

SUMMARY

The main object of the present disclosure is to provide a simple and effective way of assembling shell segments for forming tower sections in order to build a hybrid wind turbine tower of a desired height. Tower sections are therefore formed of two or more of said shell segments, the shell segments consisting of processed metal elements, that is, metal elements provided with a predefined size and shape, suitable for being assembled to one another through a hybrid vertical joint, usually formed in situ of concrete, for obtaining a tower section. Several tower sections can be then joined to one another to build a hybrid wind turbine tower structure.

According to the present method, an auxiliary structure, for example, a self-supported structure, is first assembled by providing at least a first series of auxiliary pillars. The first series of auxiliary pillars define a first sub-structure and therefore an auxiliary structure may be include one or more sub-structures. The auxiliary pillars are joined to each other using reinforcing beams. The first series of auxiliary pillars could be anchored to a foundation if required.

Then, one or more metal shell segments are arranged adjacent to each other defining a hollow tubular structure. Joining of shell segments is carried out by forming a composite steel-concrete connection arranged substantially overlapping at least a portion between said adjacent shell segments. For this, a formwork is attached to the auxiliary pillars before concreting the columns. Additionally, joining of shell segments requires the sealing of vertical joint portions between adjacent shell segments.

Shell segments are thus joined to form a tower section. The auxiliary structure is first assembled, i.e. before mounting the shell segments, so that the auxiliary structure is internal to the shell segments once they are assembled. The auxiliary structure serves the purpose of attaching the formwork to the shell segments, stabilizing the shell segments during the phase of joint formation and provide accessibility from the inside of the tower section.

The present method may further include the step of assembling at least a second additional series of auxiliary pillars above the first series of auxiliary pillars to form a second auxiliary sub-structure. This allows an internal auxiliary structure of a desired height according to corresponding tower sections to be made. This second additional series of auxiliary pillars may be lifted up, for example, by being passed inside a gap existing between the first series of auxiliary pillars that are already mounted, that is, inside a gap existing inside the first auxiliary sub-structure.

This step of assembling of additional series of auxiliary structures above the others for forming different tower sections may be repeated in order to obtain an auxiliary structure of desired height as required. This could require the use of reinforcing beams for joining the pillars to each other.

It is envisaged that the method herein disclosed could further include the steps of providing additional shell segments above the already fitted ones, to form more tower sections and connecting the shell segments of different tower sections to each other.

Preferably, the step of assembling an internal auxiliary structure may further include the step of arranging a working platform on the top of each auxiliary sub-structure. One, some or all of the working platforms may be permanent. Whether the working platforms are permanent or not, they can be fixed to the shell segments. Whether the working platforms are permanent they can be fixed both to the shell segments and the auxiliary pillars of the corresponding sub-structure. Fixing of the working platforms may be carried out by suitable platform attaching members that may include angled plates joined both to a portion of the platform and to the formwork. Fixing of the working platforms to the auxiliary pillars may be carried out through the use of attaching plates.

At least one of the series of auxiliary pillars forming internal auxiliary structure may be equal in number as the number of shell segments forming each tower section. Additionally or alternatively, one or more of the series of auxiliary pillars forming internal auxiliary structure may be placed in front of the location where the attaching formwork is arranged.

The method may further include the step of disassembling at least one auxiliary sub-structure.

The provision of the auxiliary structure according to the disclosed method in a way that it is internal to the shell segments allows elements such as pillars to be easily lifted thus avoiding the use of cranes or other extra scaffolding. With this feature, support is also provided for the shell segments forming the tower sections of the wind turbine tower. Part of the auxiliary structure, such as the working platforms, can be permanent, that is, being part of the structure of the wind turbine tower thus stiffening the tower section.

The provision of working platforms on the top of each auxiliary sub-structure during the assembling process avoids having to add platforms once the tower has been erected thus improving the accessibility inside the tower and the assembly and installation tasks, for example.

BRIEF DESCRIPTION OF THE DRAWINGS

One example of the present hybrid wind turbine tower will be described in the following, only by way of non-limiting example, with reference to the appended drawings, in which:

FIG. 1 is an elevational view in which one auxiliary sub-structure with attaching formworks has been diagrammatically shown;

FIG. 2 is an elevational view in which two auxiliary sub-structures with attaching formworks in an assembled condition have been diagrammatically shown;

FIG. 3 is an elevational view in which a complete auxiliary structure, formed of four auxiliary sub-structures, with attaching formworks and an assembled tower section with shell segments positioned has been diagrammatically shown;

FIG. 4 is a top plan view of a working platform in which auxiliary pillars of the auxiliary sub-structure and attaching formworks are shown;

FIG. 5 is a fragmentary view of an enlarged detail of the auxiliary structure in FIG. 4;

FIG. 6 is a close-up view of the highlighted area A in FIG. 7; and

FIG. 7 is an elevational view in which two assembled auxiliary structures, each of them formed of four auxiliary sub-structures, with attaching formworks and two assembled tower sections with shell segments positioned has been diagrammatically shown.

DETAILED DESCRIPTION

According to FIGS. 1, 2 and 3, examples of auxiliary sub-structures and a structure of a tower section for a wind turbine hybrid tower are shown. Auxiliary sub-structures shown have been all indicated at 10 and they can be each of approximately 5 m height. The provision of several auxiliary sub-structures 10 one above the other results in a complete auxiliary structure that has been indicated at 101 in FIGS. 3 and 7 of the drawings, and an assembled tower section has been indicated at 100. Several tower sections 100 can be joined to each other through standard joining members such as flanges or the like.

An auxiliary structure 101 may be cylindrical or frusto-conical in shape and therefore corresponds to each tubular level of the assembled wind turbine hybrid tower section 100. The shape of auxiliary sub-structures 10 could be of course different from that shown in Figs. as required.

Each auxiliary sub-structure 10 includes a support framework 20 and a number of formworks, for example four, each indicated at 50. Each formwork 50 join two adjacent shell segments 15, which include a plate such as a curved metal plate (e.g. a steel plate). The auxiliary sub-structure 10 is provided such that it is internal to the shell segments 15, as shown in the Figs.

Shell segments 15 are attached to one another through a hybrid vertical joint indicated as a whole at 30 in FIGS. 4 and 5. The hybrid vertical joint 30 includes a column of concrete 40 made of concrete or steel reinforced concrete and arranged such that it overlaps at least part of each adjacent shell segments 15, a formwork 50 for confining concrete of the column of concrete 40 and a sealing joint 45 between shell segments 15. The formwork 50 may include, for example, a first plate associated with a first shell segment 15 and a second plate associated with a second, adjacent shell segment 15 such that, in the assembled condition, the first and second plates of adjacent shell segments 15 respectively define an inner volume suitable to be filled with concrete to form column 40. Other arrangements of the formwork 50 could be also used as required such as for example a formwork 50 including a single plate associated with one shell segment 15 with said single plate being shaped to define an inner volume suitable to be filled with concrete to form column 40 could be used. Shear connectors 55, whether they are welded or not to shell segments 15, can be provided embedded in the column of concrete 40 for ensuring shear stress transmission between shell segments 15.

Although column 40 is shown internal to the assembled tower section 100 in FIG. 5, it may be of course arranged outside the assembled tower section 100, or even both in the interior of the assembled tower section 100 and outside the assembled tower section 100, as required. The vertical joint sealing material 45 can be further added if necessary.

Before providing the shell segments 15 to form a tower section 100, the complete auxiliary structure 101 should be assembled by joining a number of auxiliary sub-structures 10, which are formed by support frameworks 20 and attaching formworks 50. In the example shown in the Figs., the support framework 20 is a self-supported structure arranged such that when the shell segments 15 are provided it is internal to said shell segments 15, as diagrammatically shown in FIG. 4. The support framework 20 is provided with several, e.g. first and second, series of auxiliary pillars 60, which are joined to each other through beams 94 and stiffener bars 85, when required, forming auxiliary sub-structures 10. Auxiliary pillars 60 can be first anchored to a foundation (not shown) if necessary. In the example shown, the auxiliary pillars 60 are equal in number as the number of shell segments 15, i.e. four, although in other examples pillars 60 could be different in number according to the requirements and defining a complete auxiliary structure. The combination of several auxiliary sub-structures 10 defines a complete auxiliary structure 101, which configures a support for the assembly of shell segments 15 of respective tower sections 100.

Fixing members 70 associated both with the support framework 20 and with the formwork 50 is provided. The fixing members 70 can be configured to different sizes of the formwork 50 and it includes one or several stiffening plates 75. In use, one end of each stiffening plate 75 is fixed to a corresponding auxiliary pillar 60 through a corresponding connecting bar 102, and the other end avoids the movement of the formwork 50 when the concrete is poured during concreting phase of the column, as shown in FIG. 6.

As stated above, a number of auxiliary pillars 60 can be arranged one above the other as shown in FIG. 6 in order to obtain an internal support framework 20. Auxiliary pillars 60 can be fixed to each other through a connecting member 65 as shown in FIG. 6. The connecting member 65 is shaped for being attached to the lower end of a first pillar 60 and for being inserted within the upper end of a second, underlying pillar 60 that is in line with the first pillar 60. Equivalent joining members can of course be employed for fixing auxiliary pillars 60 to each other in order to obtain an internal support framework 20 of a desired height.

The additional series of auxiliary pillars 60 may be lifted up by being passed inside a gap 98 (see FIG. 4) that is formed in the working platforms 90. This step of assembling of additional series of auxiliary pillars 60 above the others for forming different auxiliary sub-structures may be repeated as desired.

As shown in FIG. 7, beams 94 can be used for joining pillars 60 to each other to form the support framework 20. In order to stabilize the tower sections 10, stiffener bars 85 can be arranged between auxiliary pillars 60 from the same or different level. This means that joining of the auxiliary pillars 60 to each other to form the support framework 20 may be carried out by stabilizing one or several support frameworks 20 through the use of stiffener bars 85.

In the example shown, the support framework 20 is provided with working platforms 90. One example of a working platform 90 is shown in the fragmentary enlarged view of FIG. 6. A working platform 90 is fitted on the top of an auxiliary sub-structure and includes a flat surface that can be joined to beams 94 from a support framework 20. The number of working platforms 90 may be any as required. Platforms 90 may be either removable working platforms 90, for being used when assembling or disassembling the auxiliary sub-structures 10 and concreting the hybrid vertical joint 30, or permanent working platforms 90, for being left in place once the complete wind turbine tower structure has been built.

Working platforms 90 are fixed to the shell segments 15 through attaching formworks 50 and fixing members 70 as shown in FIG. 6. This is carried out by the provision of attaching members 95 consisting of a connection to the formwork 50. Beams 94 are further attached to the auxiliary pillars 60 through the use of pairs of attaching plates 97 fitted at the extremities of auxiliary pillars 60, as shown in FIG. 6. Bolts can be suitably used to tighten the attaching plates 97 against the respective beams 94.

As shown in FIG. 4, working platforms 90 are provided with two openings 98, 99. One opening 98 is located at a central portion of the working platform 90 and it is used for lifting elements. An access door can be provided to close opening 98 when not in use. The other opening 99 is located at a radial portion of the working platform 90 and corresponds to the elevator gap; it is used during the assembling process as a vertical access to operators.

An assembling method has been disclosed in which several shell segments are joined to each other in order to form tower sections of a wind turbine hybrid tower. This method can be applied either to the entire wind turbine tower or to a portion thereof. For example, the present assembling method as disclosed above could be used only in lower tower sections of the wind turbine tower, e.g. first 20-40 m from the ground, such that the wind turbine tower could be made of full complete steel tower sections (i.e. formed of a single piece tower sections) at an upper portion (higher levels) of the wind turbine tower, as in known assembling methods, and of a number of shell segments at a lower portion (lower levels) of the wind turbine tower.

The invention claimed is:

1. A method for assembling shell segments for forming tower sections of a hybrid wind turbine tower, the method comprising:
   providing at least two metal shell segments arranged adjacent to each other; and
   forming a column of concrete on at least a joint portion of adjacent shell segments;
   wherein the method for assembling shell segments further comprises:
   assembling an internal support framework before providing the shell segments
   providing an auxiliary sub-structure internal to the shell segments; and
   providing an attaching formwork for forming the column of concrete, the formwork being associated with the support framework and attached to the shell segments.

2. The method as claimed in claim 1, further comprising:
   providing at least a first series of auxiliary pillars;
   joining the auxiliary pillars to each other to form a first auxiliary sub-structure; and
   attaching the formwork to the auxiliary pillars.

3. The method as claimed in claim 2, wherein providing a first series of auxiliary pillars is performed by anchoring them to a foundation.

4. The method as claimed in claim 2, further comprising assembling at least a second additional series of auxiliary pillars above the first series of auxiliary pillars for forming a second auxiliary sub-structure in order to obtain an internal auxiliary structure of a desired height.

5. The method as claimed in claim 4, wherein the second additional series of auxiliary pillars of the at least a second additional series of auxiliary pillars are lifted up by being passed inside a gap existing between the auxiliary pillars of the first auxiliary sub-structure.

6. The method as claimed in claim 4, further comprising:
   providing additional shell segments above already fitted shell segments to form more tower sections; and
   connecting the shell segments of different tower sections to each other.

7. The method as claimed in claim 2, wherein joining the auxiliary pillars to each other to form the first auxiliary sub-structure is carried out by fixing reinforcing beams to the auxiliary pillars.

8. The method as claimed in claim 2, wherein joining the auxiliary pillars to each other to form the first auxiliary sub-structure further comprises stabilizing one or several support frameworks with stiffener bars.

9. The method as claimed in claim 1, wherein providing the auxiliary sub-structure further comprises arranging a working platform on the top of the support framework.

10. The method as claimed in claim 9, wherein arranging the working platform on the top of the support framework further comprises fixing the working platform to the shell segments through the use of platform attaching members.

11. The method as claimed in claim 1, further comprising sealing vertical joint portions between adjacent shell segments.

12. The method as claimed in claim 1, further comprising disassembling at least one auxiliary sub-structure.

13. The method as claimed in claim 1, wherein the auxiliary sub-structure is a self-supported structure.

14. The method as claimed in claim 1, wherein at least one of a series of auxiliary pillars forming the support framework are equal in number as the number of shell segments forming each of a tower section.

15. The method as claimed in claim 1, wherein at least one of a series of auxiliary pillars forming the support framework is placed in front of a location where the attaching formwork is arranged.

16. The method as claimed in claim 1, further comprising
providing a first series of auxiliary pillars,
attaching the auxiliary pillars to the formwork, and
anchoring the auxiliary pillars to a foundation.

17. The method as claimed in claim 1, further comprising
providing a first auxiliary sub-structure comprising a first
  series of auxiliary pillars attached to the formwork, and
assembling at least a second additional series of auxiliary
  pillars above the first series of auxiliary pillars for forming a second auxiliary sub-structure in order to obtain an
  internal auxiliary structure of a desired height.

* * * * *